United States Patent
Behrendt et al.

(10) Patent No.: US 7,128,837 B2
(45) Date of Patent: Oct. 31, 2006

(54) HOLLOW FIBER MEMBRANE MODULE (75) Inventors: Ulrich Behrendt, Sindelsdorf (DE); Reinhard Gergen, Rehlingen-Siersburg (DE); Franz-Josef Gerner, St. Wendel (DE); Gerhard Herres, Beckingen-Hanstadt (DE); Berthold Szperalski, Penzberg (DE); Eckehard Walitza, Aalen (DE); Wolfram Weber, Spiesen-Elversberg (DE)

(73) Assignee: Hoffmann-La Roche Inc., Nutley, NJ (US)

( * ) Notice: Subject to any disclaimer, the term of this patent is extended or adjusted under 35 U.S.C. 154(b) by 0 days.

(21) Appl. No.: 11/349,879

(22) Filed: Feb. 8, 2006

(65) Prior Publication Data

US 2006/0124531 A1 Jun. 15, 2006

Related U.S. Application Data (63) Continuation of application No. 10/075,733, filed on Feb. 14, 2002, now abandoned.

(30) Foreign Application Priority Data

Feb. 14, 2001 (DE) .................... 101 06 722

(51) Int. Cl.
*B01D 63/00* (2006.01)
*B01D 63/02* (2006.01)
*B01D 63/04* (2006.01)
*B01D 61/00* (2006.01)

(52) U.S. Cl. .................. 210/321.8; 210/500.23; 210/321.79; 210/321.71; 210/323.2; 210/644

(58) Field of Classification Search ........... 210/321.78, 210/321.79, 321.8, 321.87, 321.88, 321.89, 210/323.2, 332, 333.01, 321.81, 321.9, 500.23, 210/644, 640, 649; 85/43, 45; 96/6
See application file for complete search history.

(56) References Cited

U.S. PATENT DOCUMENTS 3,728,256 A   4/1973   Cooper, IV (Continued)

FOREIGN PATENT DOCUMENTS

DE   2650588 A1   5/1977

(Continued)

OTHER PUBLICATIONS

Abstract corresponding to DE 2700966.

(Continued)

*Primary Examiner*—Krishnan S. Menon
(74) *Attorney, Agent, or Firm*—George W. Johnston; John P. Parise; Karen J. Jacobs (57) ABSTRACT

The present invention relates to hollow fiber membrane modules for use as "immersion modules" in filtration and/or dialysis methods, in particular whenever impairments due to fouling effects are expected from the use of liquids that are contaminated or lead to deposits. The hollow fiber membrane module comprises at least one housing and a plurality of tubular hollow fiber membranes which are arranged parallel to one another in and/or around the housing in a packing space, wherein the volumetric ratio of all the hollow fiber membranes arranged in the packing space to the packing space is less than 20%. Methods for producing such hollow fiber membrane modules are also provided.

24 Claims, 6 Drawing Sheets

U.S. PATENT DOCUMENTS

| | | | |
|---|---|---|---|
| 4,218,313 A | 8/1980 | Aid et al. | |
| 4,271,014 A | 6/1981 | Aid et al. | |
| 4,289,623 A | 9/1981 | Lee | |
| 4,496,458 A | 1/1985 | Lee | |
| 4,689,255 A | 8/1987 | Smoot et al. | |
| 5,282,964 A | 2/1994 | Young et al. | |
| 5,779,897 A | 7/1998 | Kalthod et al. | |
| 5,846,427 A | 12/1998 | Kessler et al. | |
| 6,126,819 A | 10/2000 | Heine et al. | |
| 6,251,275 B1 | 6/2001 | Rekers | |
| 6,524,481 B1 | 2/2003 | Zha et al. | |

FOREIGN PATENT DOCUMENTS

| | | |
|---|---|---|
| DE | 2700966 | 7/1978 |
| DE | 19806293 A1 | 8/1999 |
| EP | 0 167 162 | 1/1986 |
| EP | 0203378 A2 | 12/1986 |
| EP | 0331067 A2 | 9/1989 |
| EP | 0 519 132 A1 | 12/1992 |
| EP | 1 008 358 | 6/2000 |
| GB | 2339155 A | 1/2000 |
| JP | 08108049 A | 4/1996 |
| WO | WO 84/01522 | 4/1984 |
| WO | WO 95/35153 A2 | 12/1995 |
| WO | WO 00/18498 A1 | 4/2000 |
| WO | WO 00/30742 A1 | 6/2000 |

OTHER PUBLICATIONS

Patent Abstracts of Japan, vol. 17, No. 025 (C-1017), (Jan. 18, 1993) & JP 04 247285 (Ebara Corp) (Sep. 3, 1992).

Patent Abstracts of Japan, XP002305798 & JP 04 247285 (Ebara Sogo Kenkyusho KK) (Sep. 3, 1992).

Patent Abstracts of Japan, vol. 1995, No. 08, (Sep. 29, 1995) & JP 07 124445 A (Daicel Chem Ind Ltd) (May 16, 1995).

Patent Abstracts of Japan, XP002305799 & JP 07 124445 A (Daicel Chem Ind Ltd) (May 16, 1995).

Patent Abstracts of Japan, vol. 016, No. 473 (C-0991) (Oct. 2, 1992) & JP 04 171030 A (Material Eng Tech Lab Inc) (Jun. 18, 1992).

Patent Abstracts of Japan, XP002305800 & JP 04 171030 A (Shinsozai Sogo Kenkyusho KK) (Jun. 18, 1992).

Patent Abstracts of Japan, vol. 011, No. 176 (C-426), (Jun. 5, 1987) & JP 62 001409 A (Kurita Water Ind Ltd) (Jan. 7, 1987).

Patent Abstracts of Japan, XP002305801 & JP 62 001409 A (Kurita Water Ind Ltd) (Jan. 7, 1987).

HOLLOW FIBER MEMBRANE MODULE

PRIORITY TO RELATED APPLICATIONS

This application is a continuation of U.S. patent application Ser. No. 10/075,733, filed Feb. 14, 2002, now abandoned. The entire contents of the above-identified application are hereby incorporated by reference.

BACKGROUND OF THE INVENTION

The present invention relates to hollow fiber membrane modules for use as what are termed "immersion modules" in filtration and/or dialysis methods, in particular whenever impairments due to fouling effects are expected on the basis of the use of liquids that are contaminated or lead to deposits, as well as to methods for producing such hollow fiber membrane modules.

Synthetic membranes have been used for separating materials for some years in industry, for example in sewage treatment or in biotechnology. In this case, a role is played, in particular, by the processing of aqueous systems, but also by the separation of gases or mixtures of organic liquids. In addition to membranes made principally from organic materials, for example polysulfones, there are also membranes that consist of inorganic materials such as, for example, aluminum oxide, carbon fibers and zirconium oxide, and which can withstand temperatures of up to 400° C.

By using pressure or underpressure, membrane filtration methods can be applied both continuously and discontinuously as ultrafiltration or, together with a concentration difference, as diafiltration. In the case of filtration volumes <1000 ml, filter cells are frequently equipped with membrane flat filters, whereas capillary or hollow fiber systems are used for larger volumes. The term capillary or tube membrane is used where the diameter of the tubular membrane >1 mm, and the term hollow fiber membrane when the diameter <1 mm, the diameter of a dialysis membrane typically being 0.2 to 0.5 mm.

Membranes for filtration or dialysis methods constitute thin film-like, either "dense" or porous separating layers. Depending on pore size, the porous separating layers are permeable only for specific molecule or particle sizes whereas, depending on the solubility and diffusivity of the materials to be separated in the substance of the separating layers, "dense" separating layers permit the materials to permeate faster or slower and therefore lead to separation. Membranes frequently have a foam-like support structure, with 60% to 80% hollow space, which supports the actual separating layer. Asymmetrically constructed membranes consist of a highly porous support structure in the case of which the size of the cavities inside the support structure decreases toward the side which supports the actual separating layer.

In order to process relatively large volumes of solution, tube-shaped membrane bundles made from hollow fibers or capillary membranes which permit a larger passage of solutions because of a large membrane surface, are introduced directly into the solution to be processed as what are termed immersion modules. In order to protect the membrane bundles against mechanical damage, which could be effected, for example, by forces arising from the liquid flow, the membrane bundles are frequently accommodated in a housing that lends the hollow fiber membranes sufficient protection and stability toward the outside. In this case, the housing has openings that are intended to permit the exchange of solutions between the housing interior, that is to say the hollow fiber membranes, and the medium in which the hollow fiber membrane module has been immersed.

In the design normally employed for a membrane module and which cannot be designated as an immersion module, the walls of the protecting housing have no openings, that is to say they are impermeable, and instead of this the housing has two connections, specifically a feed line and a withdrawal line through which the medium to be processed is fed to the outer surfaces of the hollow fibers and then led away again from the latter.

In the case of such normally used modules, the aim is as high a packing density as possible, which means that as many hollow fiber membranes as possible are accommodated in parallel in the housing interior, and the housing therefore has a high packing density. The term "packing density" refers in percentage terms to the ratio of the volume of all the hollow fiber membranes including their wall volume to the volume of the housing in which the hollow fibers are arranged. A high packing density therefore means a low volume for the hollow or free spaces inside the housing that are formed between the tubular membrane fibers. A natural upper limit to the packing density of <100% results from the fact that it is possible to arrange in parallel inside the defined volume of the housing only a number of tubular membranes which is such that they do not exhaust the prescribed volume. The limitation arises because when the tubular membranes touch interspaces are produced that are not tubular in shape and therefore leave over a residual cavity even given the most ideal arrangement. The packing density is, however, limited in addition by two further important factors. On the one hand, when potting the hollow fiber ends it is necessary to introduce sealing material between the hollow fibers and, on the other hand, the solutions being used are also to flow around the hollow fibers at the outer surface, so that, depending on the mode of operation of the module, it is possible either to bring a solution to be filtered into contact with the membranes, or, instead, to lead off filtrate. The hollow fiber bundles must be embedded at their ends in what is termed potting material so as to produce at each end in this way, just as in the case of shell-in-tube heat exchangers, a tube sheet denoted below as a "potting". The result of this is the production, together with the housing into which the bundle is introduced, of two spaces that are separated by the membrane. The separated spaces thus produced can then respectively be provided with a feed line and a withdrawal line, in order to supply the feed to be treated to one space and to lead it therefrom as retentate, and to lead off the filtrate obtained from the feed from the other space.

The packing density of the normally used, conventional hollow fiber membrane modules is therefore approximately 25% to 30%.

Conventional hollow fiber membrane modules are designed chiefly for use in particle-free solutions, that is to say solutions or media that are not contaminated or do not tend to deposits. Such conventional, densely packed membrane modules with a perforated module housing are, however, frequently likewise used for technical processes in which particle-containing media, for example contaminated liquids in sewage treatment. Particularly in the case of such particle-containing media, what is termed fouling occurs in the course of the filtration process, that is to say in the course of time deposits that diminish ever more strongly the permeability of the membranes for the materials to be separated are increasingly formed on the membrane surfaces. This can go so far that the convective transport inside the hollow fiber membrane module, that is to say between the hollow filaments, is stopped completely, and that the transport performance of the entire module drops by orders of magnitude, since only a low percentage of the overall membrane surface area accommodated in the module still remains available for separating materials. If, for example, bundles of hollow fibers are used, it is possible, in particular, only for the hollow fibers arranged on the outer circumference of the bundle to participate in the convective transport of the exterior. In the case where the hollow fibers are arranged in the interior of the module, during the most exceptional case, it is only diffusion processes that still occur, but they are likewise greatly impaired because of the deposits.

It is normal to apply chemical or mechanical cleaning methods such as backflushing, mechanical vibration, ultrasound methods etc. in order to remove deposits from fouling processes. Apart from the fact that these cleaning methods are associated with a high outlay on energy, they always harbor the risk of mechanical damage to the hollow fiber membranes. If these customary measures can no longer be applied, the only measure remaining is a suitable incident flow onto the membrane surface through the feed solution.

In order to suppress fouling processes specifically in the case of applications in the revival pools of sewage-treatment plants, a filtration method (WO 99/29401; Zenon Environmental, Inc., Burlington, Ontario, Calif.) has been developed in which capillary membranes are introduced into the aeration tanks directly without a protective housing. In order to keep the fibers free from deposits, they are bathed with a uniform stream of air bubbles. However, these fibers have a partially substantially larger diameter than the fibers normally used, which have a diameter of less than 1 mm. They also have thick support structures. Moreover, these hollow fibers can be used only at such points in the aeration tank at which the mechanical forces induced by the flow are very small or can be kept very small. In this specific application, the spaces between the individual capillary membranes are up to several millimeters.

Also known in the art are commercially available hollow fiber systems in which several individual, tightly packed modules are accommodated in a housing, for example, with a packing density of 20 to 35%, in parallel interconnection. The result of this in principle is isolated strands between which there is sufficient space to ensure better incident flow or throughflow of the individual strands, and to minimize fouling processes. However, such systems require a technically very complicated housing whose production is correspondingly expensive.

In addition, use of what are termed spacers is known in the case of wound modules surrounding flat membranes, or electrodialysis stacks. The spacers are intended, for example, to ensure uniform spacings between the individual membranes and, on the other hand, simultaneously to distribute the flow of the solution into the respective feed-side or permeate-side compartments of the membrane module, in order thus to effect a flow over the entire membrane. The spacer materials used are reticulate structures with mesh sizes of different magnitude. However, these conventional spacer materials lead to an additional pressure drop in the liquid flow which can be equalized only by an additional expenditure of energy. Conventional modules with spacers therefore require a forced flow through their exterior.

SUMMARY OF THE INVENTION

The present invention provides a hollow fiber membrane module for filtration, diafiltration and/or dialysis methods, comprising at least one housing and a plurality of tubular hollow fiber membranes which are arranged parallel to one another in and/or around the housing in a packing space, wherein the volumetric ratio of all the hollow fiber membranes arranged in the packing space to the packing space is less than 20%.

The present invention also provides a method for producing a hollow fiber membrane module, comprising rolling a shaped piece together to produce a housing shape, and arranging the hollow fiber membranes in and/or around the housing in a packing density of less than 20%.

BRIEF DESCRIPTION OF THE DRAWINGS

FIG. 1 (a–d) shows a schematic of an intermediate step in the production of the hollow fiber membrane module according to the invention, FIG. 2 (a–c) shows an embodiment of the hollow fiber membrane module according to the invention in a perspective view and in cross section, as well as another embodiment in cross section, FIG. 3 (a–d) shows a further embodiment of a hollow fiber membrane module according to the invention in a perspective view with various exemplary embodiments of segmentation elements.

DETAILED DESCRIPTION OF THE INVENTION

The present invention provides a hollow fiber membrane module that is suitable for use as an immersion module in the most diverse membrane material separation methods, and in the case of which the formation of deposits on the membrane surfaces, which is caused by the inadequate incident flow onto the membranes, is removed as far as possible or completely during the separation method, in the case of which module there is an effective flow around, or incident flow onto, the hollow fiber membranes arranged to form bundles, and in the case of which module the material transport from the feed space into the permeate space remains virtually constant during the entire material separation process, it also being possible to use the hollow fiber membrane module both in particle-free media or solutions and in particle-containing media or solutions, in particular contaminated media or media tending to deposits.

The hollow fiber membrane modules according to the invention influence the flow conditions in the space between the hollow fibers, that is to say in the outer space of the hollow fibers, but not the flow in the lumen of the hollow fibers.

The present invention provides a hollow fiber membrane module that is designed, in particular, for use as an immersion module for biotechnical processes and has the following features:

The hollow fiber module comprises at least one preferably cylindrical housing that is preferably provided with openings in the lateral surface, and a plurality of hollow fiber membranes that are accommodated in or on the housing in a packing space and have an identical or different cross section, which are arranged parallel to one another, in particular with the formation of free spaces, the ratio of the volume of all the hollow fiber membranes arranged in the packing space, including their walls, to the volume of the packing space being less than 20%.

In connection with the present invention, the term packing space is understood as the housing interior enveloped by the housing of the module, to the extent that hollow fiber membranes are arranged in said interior. If hollow fiber membranes are arranged outside the housing, the term packing space is understood as the space located outside the housing in which the hollow fiber membranes are arranged, and which is formed inward by the outer surface of the housing and outward by an inner lateral surface enveloping the space containing the membrane hollow fibers, of a second housing, situated radially outward, or by a corresponding imaginary envelope or lateral surface. In a preferred design, this envelope makes contact with the peripheral edges of segmentation elements that are present in this embodiment. This lateral surface or envelope is the inner surface of a channel that is annular when seen in cross section. In particular, the channel has a circular cross section. In a preferred design, the inwardly situated housing has a circular cross section, the annular channel, surrounding this housing, of the outer housing, or the imaginary lateral surface being arranged concentrically with the housing. If membrane hollow fibers are arranged both inside and outside the inner housing, the packing space constitutes the space both inside and outside the inner housing, and thus the space that is embraced by the outer envelope of the overall space of the module, that is to say the inner surface of the annular channel.

In connection with the present invention, the term packing density is understood as the ratio of the volume of all the hollow fiber membranes arranged in the packing space, including the volume of their walls, to the volume of the packing space, expressed in percentage terms.

Thus, it is provided according to the invention that the packing density of the hollow fiber membrane module according to the invention is low and less than, preferably much less than, 20%.

In a preferred embodiment, the packing density can also be described by the ratio of the sum of the cross sections of all the hollow fibers in the packing space to the cross section of the packing space. The packing density of the hollow fiber membrane module according to the invention is therefore substantially smaller than the hollow fiber membrane modules known in the prior art, whose packing density is 25% to 30%. According to the invention, the modules have a large proportion of free spaces, that is to say of packing space in which no hollow fiber membranes are arranged over the entire length of the module. Moreover, the lateral surface of the module housing is provided with very large openings such that an unimpeded exchange of liquid can take place between the hollow fibers arranged in the housing interior and the liquid or the medium in which the module is accommodated, without impairing the stability of the lateral surface of the housing. As dictated by the low packing density and the very large surface area of the openings in the lateral surface, based on the overall surface area of the lateral surface of the housing, the flow of the liquid or of the medium can pass through the module more effectively and thus actively prevent the formation of deposits on the surfaces of the individual hollow fibers.

In connection with the present invention, the term hollow fiber bundle or hollow fiber membrane bundle is understood as hollow fibers or hollow fiber membranes that are respectively arranged in a compartment delimited by segmentation elements. In this case, the hollow fibers can be held together among one another inside the arrangement by connecting structures, for example by elements running radially around the bundles, or they can also be arranged loosely next to one another, according to the invention, however, at a spacing that permits effective flow around the fibers. Hollow fiber bundles preferably extend over the entire length of the module housing.

In further preferred embodiments of the invention, it is provided that several spaced apart hollow fiber bundles are arranged in a relatively low packing density in or on the housing provided with openings, the individual hollow fiber bundles being separated spatially from one another by segmentation elements fitted on the housing. The longitudinal axis of the segmentation elements extends parallel to the longitudinal axis of the housing and preferably over the entire length of the housing.

In one embodiment, the segmentation elements are fitted on the inner surface of the lateral surface of the housing provided with openings, and therefore project into the interior of the housing, thus producing in the interior of the housing compartments that can be filled with hollow fibers. The hollow fiber bundles are therefore arranged in the interior of the housing in this refinement.

In a further refinement of the invention, the segmentation elements are fastened on the outer surface of a first housing cylinder that, in particular, has openings in the lateral surface. The hollow fiber membrane bundles preferably fixed on the segmentation elements are therefore arranged on the outside of the lateral surface of the first housing cylinder. In this refinement, the entire module for reasons of stability in a further preferred embodiment of the invention is introduced into a second cylindrical housing that can be of circular design when seen in cross section. The second housing forms, as it were, the envelope of the packing space situated outside the inner housing and can be configured as a cage, for example. Together with the segmentation elements, the inner and outer cylinders preferably form a segmented annular channel.

The segmentation elements according to the invention that are used in these two embodiments differ from the spacer elements described in the prior art both with regard to their shape and with regard to their arrangement in or on the housing. The segmentation elements comprise a frame part that surrounds a large free passage surface. By comparison with the modules described in the prior art, the volume of the free spaces inside the modules according to the invention is substantially enlarged once more, and thus the packing density in the modules according to the invention is substantially diminished, owing to the large passage surface and also to the specific arrangement of these elements in the module, which entails a specific arrangement of the hollow fiber membrane bundles in or on the housing. The packing density inside the module according to the invention is below 10%, in particular below 5%, referred to the total number of the hollow fibers of all the bundles of a hollow fiber membrane module according to the invention. The specific configuration of the segmentation elements according to the invention likewise substantially reduces the resistance of the flow of the solution or the medium, such that the flow can more effectively flow around the hollow fibers arranged in the module, and thus the formation of deposits on the surfaces of the individual hollow fibers can be actively prevented.

The feed solution can flow turbulently over the individual hollow fiber membranes inside the module owing to the low packing density of the hollow fiber modules according to the invention inside the module, to the use of segmentation elements according to the invention with very large passage surfaces in preferred embodiments, and to the use of a module housing with very large openings. It is true, on the one hand, that in this way the high membrane surface areas of the hollow fiber modules previously described in the prior art are not achieved, but in accordance with the invention the transport coefficients vary only slightly during the entire separation process such that, by contrast with conventional hollow fiber membrane modules, the variable that is decisive for the exchange of materials, specifically the product of the membrane surface area and transport coefficient, remains virtually constant during the entire process. By contrast with conventional membrane modules, the material transfer rates in the hollow fiber module according to the invention are therefore lower at the start of the filtration process but are substantially higher on average over time than in the case of conventional devices in which severe fouling occurs in the course of time.

In connection with the present invention, the hollow fiber membrane or tubular hollow fiber membrane is understood as a technical membrane, with particular preference as a thin, film-like and porous separating layer. Such a porous membrane can also have a homogeneous supporting layer of foam-type design, especially when it is particularly thin. According to the invention, the use of membranes with a homogeneously designed supporting layer is just as possible as the use of membranes with an asymmetric supporting layer. It is preferred for the membrane module according to the invention to be a membrane filter whose membrane can, in a preferred way, be produced, for example, from ceramic or polymeric materials such as, for example, cellulose derivatives, polyamides, polyvinylchloride, polysulfone and/or teflon, and can consist thereof or contain the same in substantial portions, in particular more than 50% by weight. In the particularly preferred way, the material used to produce the membrane can be sterilized with superheated steam. The membranes preferably have a thickness of 50 to 250 μm. The membranes used in accordance with the invention are preferably designed as a tube membrane or tubular membrane.

In a particularly preferred embodiment, the invention provides that the tube membrane consists of a polymeric material. Of course, it is also possible to use other tube membranes, for example a ceramic tube membrane, as long as they have substantially tubular shapes and a pore diameter that has an appropriate selection limit, that is to say separation limit, in accordance with the respective field of application, such that specific particles, for example bacteria, viruses, cells of human, animal or plant origin, parts thereof and/or high-molecular substances are held back, whereas other particles of lower molecular weight can pass through the membrane without hindrance. It is also possible to use filtration hollow fibers, in particular microfiltration hollow fibers. The inside diameter of the tubular membrane is in a range from 0.2 to 2 mm in a particularly preferred embodiment of the present invention.

The individual hollow fiber membranes can be present inside the module housing in any desired arrangement as long as the freedom of movement of the individual hollow fibers in the flow is limited to the extent that no breaking or tearing of the hollow fibers occurs. The arrangement is substantially determined by the material properties of the material used to produce the hollow fibers, and/or by the specific intended use of the finished module. If the hollow fibers consist, for example, of a relatively flexible material and the hollow fiber module is to be used in media in conjunction with a relatively strong flow, it is advantageous to combine the hollow fibers to form a bundle or strand, and then to integrate them in the housing provided with openings, in order thus to obtain an additional fixation and/or stabilization of the fibers.

In connection with the present invention, the term "identical or different cross section" means that the cross sections of individual hollow fiber membranes, that is to say the surfaces of intersection of the hollow fibers obtained by a flat cut perpendicular to the longitudinal axis of tubular hollow fibers, can be identical or different with reference to the shape and with reference to the size. For example, the cross sections can have the shape of a circle, the shape of an ellipse or a transitional shape between circle and ellipse.

In connection with the invention, the expression "hollow fibers that are arranged parallel to one another with the formation of free spaces" means that the hollow fibers located inside or/and outside the module housing are arranged parallel to one another in such a way that not only are there obtained the free spaces which are produced in the case of a packing, theoretically as dense as possible, of prescribed cylindrical bodies in a larger housing of defined volume, that is to say of the packing space occurring naturally between these bodies, but that there is additional free space present in the packing space, for example between the hollow fibers. It is also to be taken into account that, in particular, hollow fibers made from polymeric materials are not rigid, ideally cylindrical fibers, but flexible structures frequently deviating in detail sharply from the cylindrical shape. To this extent, a parallel arrangement means the parallel alignment of the respective average direction of the hollow fibers.

It is provided according to the invention that the first and/or second housing of the module preferably has the shape of a cylinder or of what is termed a filter tube. The cylindrical housing offers advantages in many respects. On the one hand, hollow fibers can be arranged in the housing so as to provide optimal conditions for their functioning, specifically the separation of materials from solutions. On the other hand, it offers the tubular hollow fibers a particular measure of protection against mechanical damage, in particular against an excessively high mechanical loading by the liquid flow which could otherwise break or tear the fibers, which are exceptionally sensitive in some instances. The cross section of the cylindrical housing can have the shape, for example, of a circle, an ellipse or a regular polygon, for example a hexagon or an octagon.

So that it is also possible for sufficient liquid to flow from the surroundings through the first and/or second housing into the housing interior, the lateral surface of the housing cylinder is preferably provided with sufficiently large openings. According to the invention, it is provided, in particular, that the individual openings have characteristic dimensions of several millimeters. If, for example, these openings are squares in plane projection, their side length as a function of the diameter of the housing cylinder is preferably 3 mm to 20 mm, in particular 5 mm to 15 mm, preferably 7 mm to 12 mm. The ratio of the total surface area of the openings to the lateral surface of the cylinder is preferably not over 0.7. This ensures that sufficient liquid can flow through the housing into the interior. On the other hand, the ratio of the total surface area of the openings to the lateral surface of the cylinder is preferably not below 0.2, thus ensuring adequate mechanical stability of the housing. This is particularly important when the plastics normally used to produce the module housing become soft owing to a rise in temperature during the separation process. The wall thickness of the housing cylinder is determined by the required mechanical strength and can, depending on the material, be between 0.7 and 10 mm, preferably between 1 and 4 mm.

Any desired materials can be used for the first or second module housing, provided that these materials can lend the module sufficient stability. With reference to the physical properties, in this case these materials can be both flexible and rigid ones such as, for example, stainless steel. Particularly preferred, the material used for producing the module housing can be sterilized with superheated steam. According to the invention, the use of plastics, especially of polypropylene, is particularly preferred because, on the one hand, it can be processed effectively as a thermoplastic, while on the other hand it still has sufficient mechanical stability even at 121° C., the temperature normally applied in the case of sterilization with superheated steam. According to the invention, the lateral surface of the module housing can be produced in one piece. However, it can also consist of a plurality of individual parts that are connected to one another, for example, via hinges or other connecting elements. If the module housing comprises several individual parts, these can consist of the same material or of different materials. In a preferred embodiment, the individual parts consist of the same material and also have the same dimensions.

In an advantageous embodiment of the invention, it is provided that the hollow fiber membrane module additionally has a first housing connection that serves for feeding a solution or a medium to the fiber interior of the hollow fiber membrane bundle, and is preferably fitted at one end of the housing cylinder. In an advantageous refinement, the hollow fiber membrane module is, however, equipped with a second housing connection, which serves for withdrawing the solution or the medium or a filtered solution from the fiber interior, whose material composition has now been changed by the separation process taking place in the module, and is preferably fitted at the other end of the housing cylinder. In this embodiment, the convective material transport outside the fibers is produced by the flow of the surroundings, in which the module is immersed. It is provided according to the invention that this embodiment according to the invention of the hollow fiber membrane module provided with the two housing connections is used, in particular, in a stirred-tank reactor.

In a particularly preferred embodiment of the invention, it is provided that a plurality of spaced-apart hollow fiber bundles are arranged in a low packing density in a, preferably cylindrical, housing, the hollow fiber bundles being separated spatially from one another by segmentation elements fastened on the inner lateral surface of the cylinder. The segmentation elements according to the invention therefore project into the interior of the housing cylinder, and lead to a compartmentalization of the housing interior, the hollow fiber bundles being arranged in the compartments thereby produced. The hollow fiber membrane module is lent additional stability by installation of the segmentation elements.

The segmentation elements according to the invention form a preferably rectangular frame part that fixes the external dimensions of the segmentation elements. The frame part encloses a free passage surface. In connection with the present invention, the term "passage surface of the frame part" relates to the material-free surface(s) surrounded by the frame part, which permits unimpeded passage of liquids in both directions between two adjacent compartments separated from one another by the segmentation element. The passage surface can, if appropriate, be interrupted by stabilization elements arranged inside the frame part, such as transverse struts or lattice structures, which serve for stabilizing the frame part and thus the segmentation element. Depending on the envisaged field of use of the hollow fiber module, these stabilization elements can be of different width referred to the dimensions of the frame part or the passage surface, the stabilization elements being preferred to be relatively narrow. Likewise, the spacing between the stabilization elements can differ, relatively large spacings being preferred according to the invention.

It is provided according to the invention that, referred to the total surface of the stabilization elements, that is to say the transverse struts or the lattice structure, the passage surface embraced by the frame part is below 20%, preferably below 10%, with particular preference 2%.

According to the invention, it is provided that the segmentation sections consist of any desired material, as long as this has adequate stability characteristics such that the spacings between the individual hollow fiber membrane bundles can be ensured over lengthy time periods, and the hollow fiber membrane module is lent additional stability. It is preferred to use for producing the segmentation element materials that can be sterilized with superheated steam. The segmentation elements can be produced from the same materials as the material used to form the cylinder, but can also consist of other materials.

The dimensions of the individual segmentation elements used inside a module can be the same or different. In a preferred embodiment, all the segmentation elements have a length that is equal to the length of the housing cylinder, and a height that is, for example, equal to the radius of the cross section of the housing cylinder, or smaller than said radius. In a further preferred embodiment, the segmentation elements are shorter than the housing and are distributed over the length of the housing with appropriate axial interspaces, no further segmentation element being arranged inside these axial interspaces over the full azimuth angle inside the housing. In yet a further preferred embodiment, the segmentation elements are as long as the pottings provided at the ends of the housing and are arranged at the housing ends such that these pottings are segmented. In a preferred embodiment, the height of the segmentation elements is smaller than the radius of the cross section, and the segmentation sections have additional elements, in particular spacers, on the side diverted from the inside of the housing cylinder. These spacers are, for example, strips fitted on one or both sides on the longitudinal edge, averted from the housing wall, of the frame part and at right angles to the frame part of the segmentation elements. The spacers of all the segmentation elements form an inner cylinder around the longitudinal axis of the housing cylinder and effect an additional fixing of the segmentation elements. The spacers can have openings in a preferred embodiment.

Just like their specific arrangement inside the module according to the invention, the specific configuration of the segmentation elements according to the invention has the effect that the total volume of the free spaces between the hollow fibers is substantially enlarged again, and is therefore much larger than in the case of the modules described in the prior art. That is to say, in such modules according to the invention the packing density is substantially reduced again by the installation of the segmentation elements according to the invention. In the hollow fiber membrane modules according to the invention that contain segmentation elements, the packing density of the hollow fiber membranes, when referred to all the hollow fibers of a bundle of a hollow fiber membrane module according to the invention, is at most 20%, preferably at most 10%, while, referred to the total number of all the hollow fibers of all the bundles, the packing density is under 10%, preferably under 5%.

By contrast with the conventionally employed spacer material, the installation of the segmentation elements according to the invention in the hollow fiber modules, in particular the relatively large passage surface embraced by the frame part, ensures that a virtually unimpeded exchange of liquid is ensured between the individual compartments of the module, and thus between the individual hollow fiber bundles. Since the resistance of the module is substantially reduced on the basis of this passage surface by comparison with the flow of the solution or the medium, the flow can flow more effectively through the module and thus more effectively prevent the formation of deposits on the surfaces of the individual hollow fibers. Since the pressure loss of the flow is simultaneously minimized, there is, however, no need for additional expenditure of energy for the flow through the module, as is required with modules known in the prior art in which conventional spacers are used.

In a further particularly preferred embodiment of the invention, it is provided that the segmentation elements are fastened on the outer surface of a first housing cylinder whose lateral surface preferably has openings. The hollow fiber membrane bundles are arranged in this case in the interspaces, defined by the spaced apart segmentation elements, or compartments on the outside of the lateral surface of the first housing cylinder, preferably additionally being fixed, for example by holding rings. In a preferred embodiment, the entire module is located inside a second cylindrical housing that is preferably designed as a cage which forms the outer boundary of the packing space and serves chiefly for stabilizing the hollow fiber membrane module.

Of course, membrane modules according to the invention can also have segmentation elements inside and outside the first, that is to say inner, housing.

In a particularly preferred embodiment of the present invention, it is provided that all the components of the hollow fiber membrane module according to the invention, that is to say housings, hollow fibers and segmentation elements, consist of materials that can be sterilized with superheated steam.

Depending on which membrane is inserted into the module, that is to say whether a microfiltration, ultrafiltration, nanofiltration or dialysis membrane is involved, the hollow fiber membrane module according to the invention is suitable, in particular, for use in the filtration or dialysis of media that have a powerful fouling effect. For example, the hollow fiber membrane module according to the invention can be used as what is termed reactor dialysis membrane module in fermenters for removing metabolic products of the fermented cells and/or for feeding nutrients. A further use can take place in bioreactors, in feed and bleed mode, in order to remove liquid with products from the reactor.

The invention also relates to methods for producing the abovenamed hollow fiber membrane modules, in particular modules that have several hollow fiber membrane bundles because of the use of segmentation elements. In a preferred embodiment, a smooth material or shaped piece that is flat on the spatial projection and is intended to form a later lateral surface of the first or only, preferably cylindrical housing is provided in this case with segmentation elements.

The segmentation elements can, for example, be fitted or clipped on a flat material of the lateral surface with the aid of elements specifically provided therefore, for example knobs. Consequently, the material of the lateral surface is held together or rolled up to form a cylinder of circular or other shape, for example of rectangular cross section. In this case, the material of the lateral surface can be rolled up such that the segmentation elements are located on the inner surface of the cylinder. Moreover, the material of the lateral surface can also be rolled up such that the segmentation elements are located on the outer surface of the cylinder. In one embodiment, before the housing cylinder is rolled up, the hollow fibers can be inserted into the interspaces or compartments, provided by the fastened segmentation elements, in a desired arrangement and in accordance with the provided packing density, it being possible to fix the hollow fibers before rolling up, if appropriate. In this case, after being rolled up the housing cylinder is subsequently closed and sealed in the usual way at the cylinder ends. In another embodiment, the hollow fibers can, however, also be inserted into the compartments defined by the segmentation sections after the housing cylinder is rolled up. The module can preferably be inserted into a second housing cylinder, which is designed as a cage in a preferred form.

The invention also relates to methods that are simple and cost-effective to carry out for the purpose of producing hollow fiber membrane modules. The method is defined, inter alia, by virtue of the fact that a flat-shaped piece that is provided with openings and intended to form the later lateral surface of the cylindrical housing is brought into a cylindrical shape by being rolled up, and hollow fiber membranes are arranged in and/or around the housing. Depending on which properties the material to be rolled up exhibits in the spatial projection, for example whether it is flexible or relatively rigid, whether it is designed in one piece and, for example, does or does not include notches at which the material can be bent, or whether it comprises several parts that are, for example, of identical dimensions, which are connected to one another via hinges or similar elements, preferably, the cross section of the cylinder thereby obtained can be circular or polygonal. The housing material can be designed as a flexible mat, a flexible lattice, a mat with a hinge-like part etc. It is also possible thereafter for the hollow fibers provided to be introduced into the housing cylinder thus obtained in the desired arrangement and with the desired packing density.

In a further preferred embodiment of the present invention, it is provided that further parts, in particular segmentation elements are, (already) fitted on the flat shaped piece used to form the housing cylinder, said elements, being suitable for separating individual hollow fiber bundles spatially from one another in the later housing cylinder and/or for lending the housing cylinder additional stability. These segmentation elements can have been produced together, for example using an injection-molding or casting process, for example in one operation with the material used to form the housing cylinder. That is to say, the material that is to be rolled up to form the cylindrical shape and is provided with segmentation elements can be designed in one piece. The segmentation elements can, however, also have been produced separately, and subsequently be fitted or clipped on or fastened in a similar way on or in the lateral surface of the housing at elements, for example knobs, provided for the purpose.

The material of the lateral surface is subsequently rolled up to form a cylinder. In this case, the material of the lateral surface can be rolled up such that the segmentation elements are located on the inner surface of the cylinder to produce a hollow fiber membrane module according to the invention whose housing interior is subdivided into compartments by the segmentation elements. However, the material of the lateral surface can also be rolled up such that the segmentation elements are located on the outer surface of the cylinder. In this case, however, there is also the possibility, in particular, firstly of rolling the material cylinder together and then clipping the segmentation elements outside onto the cylinder thus formed, or fastening them in a suitable way.

In one embodiment of the method according to the invention, before the housing cylinder is rolled up, the hollow fibers can be inserted in the desired order and in accordance with the prescribed packing density into the interspaces or compartments prescribed by the fastened segmentation elements. Before the housing cylinder is rolled up, the hollow fibers are preferably fixed on the segmentation elements, use being made, in particular, of thin lattices, cable ties or similar elements. In this case, after being rolled up the housing cylinder is subsequently closed and sealed in the usual way at the cylinder ends by potting the fiber ends in the usual way. In another embodiment, the hollow fibers can, however, also be inserted after the housing cylinder has been rolled up into the compartments defined by the segmentation sections, and be fixed in a suitable way inside the compartments. After the module thus obtained has been filled with the hollow fiber bundles, the housing cylinder is subsequently closed and sealed at the cylinder ends in the usual way by potting the fiber ends in the usual way. Thereafter, the module fitted with the hollow fiber membrane bundles is inserted into a second housing cylinder that is preferably designed as a cage, and is thereby stabilized.

With regard to the Figures, identical reference numerals refer to devices or elements thereof that are identical in design or/and function.

Figure 1A:
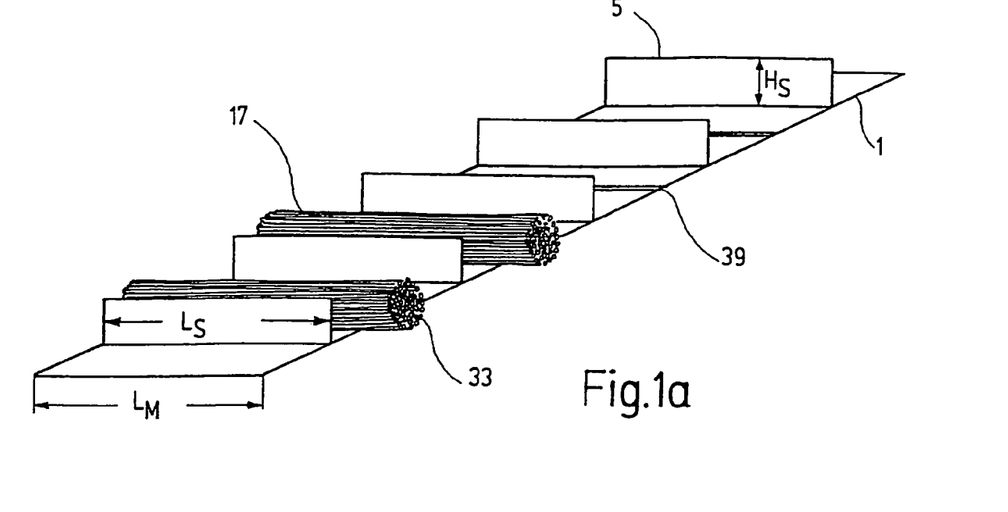
Figures 2A, 2B:
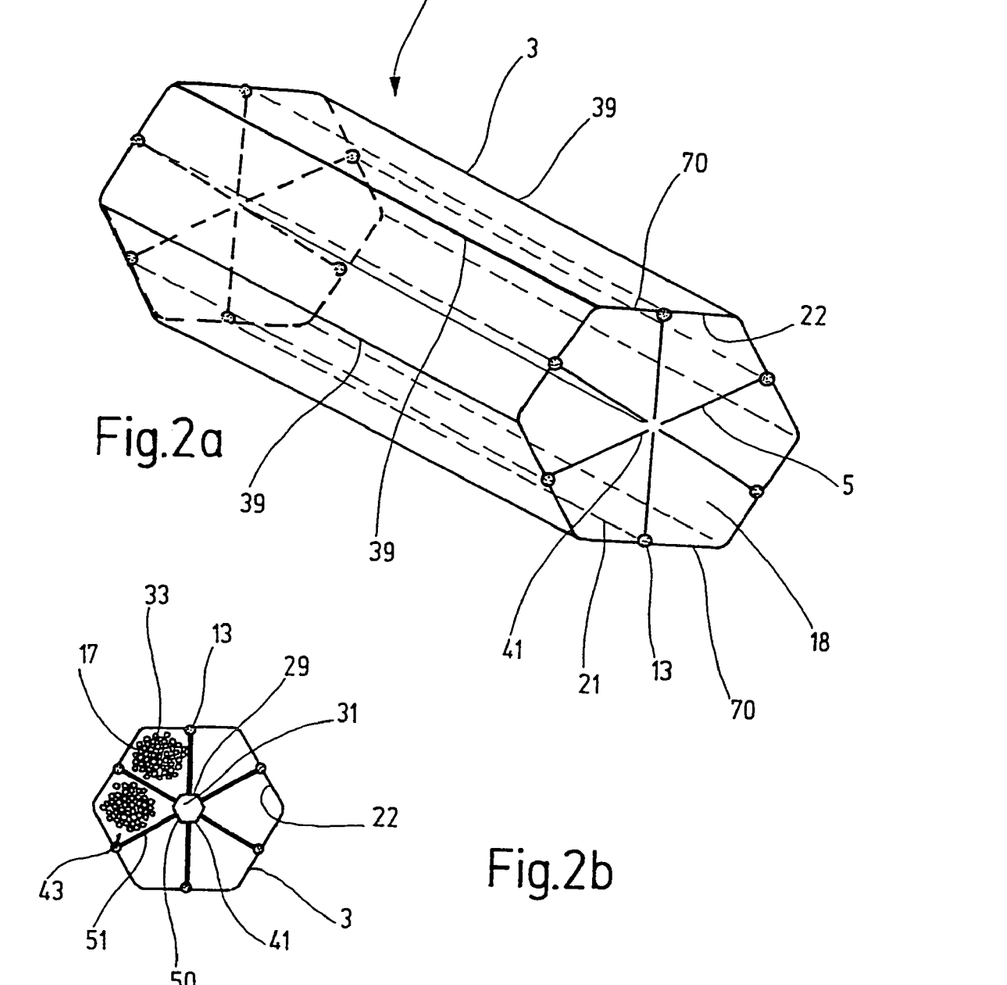

FIG. 1 a) shows in schematic form the housing lateral surface or the wall 1 of a hollow fiber membrane module 100 according to the invention, which wall can be rolled up into the hexagonal shape of a housing 3 represented by the example in cross section in FIG. 2a). Fitted on the wall 1 are rectangular segmentation elements 5 of length $L_S$ and height $H_S$ that are uniformly spaced apart. The length $L_S$ of the segmentation elements corresponds to the length $L_M$ of the housing 3. The height $H_S$ corresponds approximately to 90 to 95% of half the height of the housing 3. Constructed in the housing lateral surface 1 are lines of weakness 39 that are uniformly spaced apart and alternate with the segmentation elements 5, and which facilitate the folding over of the housing lateral surface 1 into the final shape of the housing 3 and, in the final shape, form the edges of the housing 3 of FIG. 2, which is of hexagonal cross section.

Figure 1B:
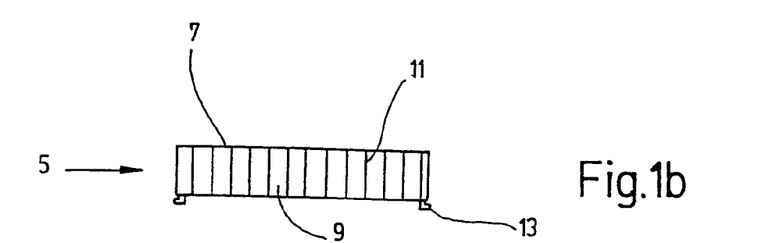
Figure 1C:
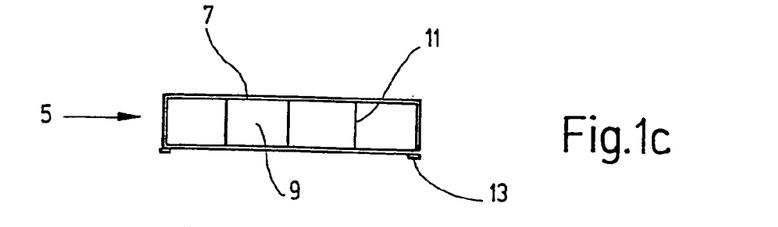
Figure 1D:
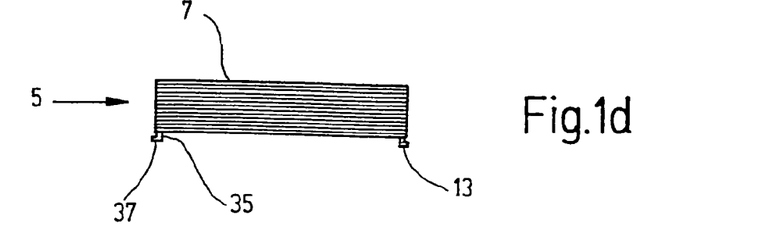

Various embodiments of segmentation elements 5 are shown in FIGS. 1b), c) and d). The segmentation elements 5 respectively comprise a rectangular frame part 7 that surrounds the passage surface 9. The passage surface 9 is subdivided into smaller individual surfaces by the stabilization elements 11, which are designed as connecting bars or lattices. Moreover, the segmentation elements 5 have at each of their ends two fastening elements 13 that resemble extensions and serve for fastening the segmentation elements 5 on the wall 1. The fastening elements 13 have two limbs 35 and 37 which enclose a right angle. The limb 35 is seated on the longitudinal side of the segmentation element 5, whereas the second limb 37 points away from the segmentation element 5.

FIG. 1a) also shows in a schematic form the arrangement of hollow fibers 33 between two adjacent segmentation elements 5, and hollow fiber bundles 17 in compartments 21.

Figure 2C:
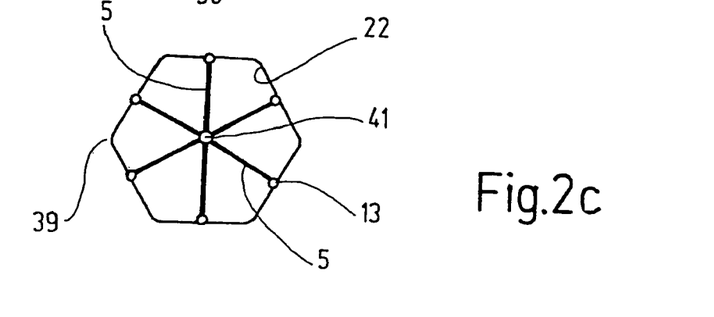

FIG. 2a) shows a perspective illustration of the shape of the housing 3, which is hexagonal when seen in cross section. Starting from the illustration of the wall 1 in FIG. 1 a), the wall 1 is rolled up to produce the module 100 by virtue of the fact that the segmentation elements 5 project into the interior 18 of the cylinder 3 and subdivide the latter into the compartments 21. The height $H_S$ of the segmentation elements 5 corresponds approximately to half the height of the housing 3 of the module according to the invention, such that in the case of the illustrated shape, hexagonal when seen in cross section, with in each case two opposite sides 70 of equal length arranged parallel to one another, the segmentation elements 5 arranged centrally perpendicular to the sides 70 almost touch one another in the center of the housing 3. The interior or packing space 18 of the housing 3, that is to say the inner volume of the housing 3, is therefore virtually completely compartmentalized. Also illustrated are the fastening means 13 for fastening the segmentation elements 5 on the lateral surface of the housing 3. The cross section of the module according to the invention as in FIG. 2a) is illustrated in FIG. 2c). It is clearly to be seen that the edges 41 of the longitudinal sides of the segmentation elements 5 that are averted from the housing inner surface 22 almost abut one another at the center of the packing space 18 and therefore form compartments 21 that are separated from one another, or virtually so. The dimensions of the segmentation elements can in this case be such that all the edges touch in the middle, or nearly do so, as a result of which they can then, if necessary, be fixed lightly against one another by suitable elements in order to increase the stability of the entire module. The cross sections 2b) and 2c) show further different embodiments of the module 100. The two embodiments differ from one another in that in cross section 2b) use is made of segmentation elements 5 that have spacers 29 arranged on the edge 41, averted from the inner surface 22 of the housing 3, of the longitudinal side, averted from the inner surface 22, of the segmentation elements 5. The spacers 29 can be designed as a material reinforcement of the longitudinal side edge 41 of the segmentation element 5. It can also be provided that the longitudinal side edge 41, facing the center of the packing space 18, of the segmentation element 5 has a bent-over part, reinforcement, attenuation or similar on both sides at a right angle in each case. The spacers 29 of the segmentation elements 5 in this case enclose a second interior 31 over the entire length of the housing 3. Seen in cross section, the spacers 29 have a T-profile as an extension of the segmentation element 5, the limbs 50, 51 of the T projecting at a right angle from the segmentation element 5, abutting the limbs of an adjacent spacer 29 and thus forming a hexagonal interior 31 when seen in cross section. The spacers 29 can have openings (not illustrated here). Illustrated in some compartments 21 are hollow fibers 33 lying loosely against one another. Also illustrated is the free space 43 in the packing space 18.

Figures 3A, 3B, 3C, 3D:
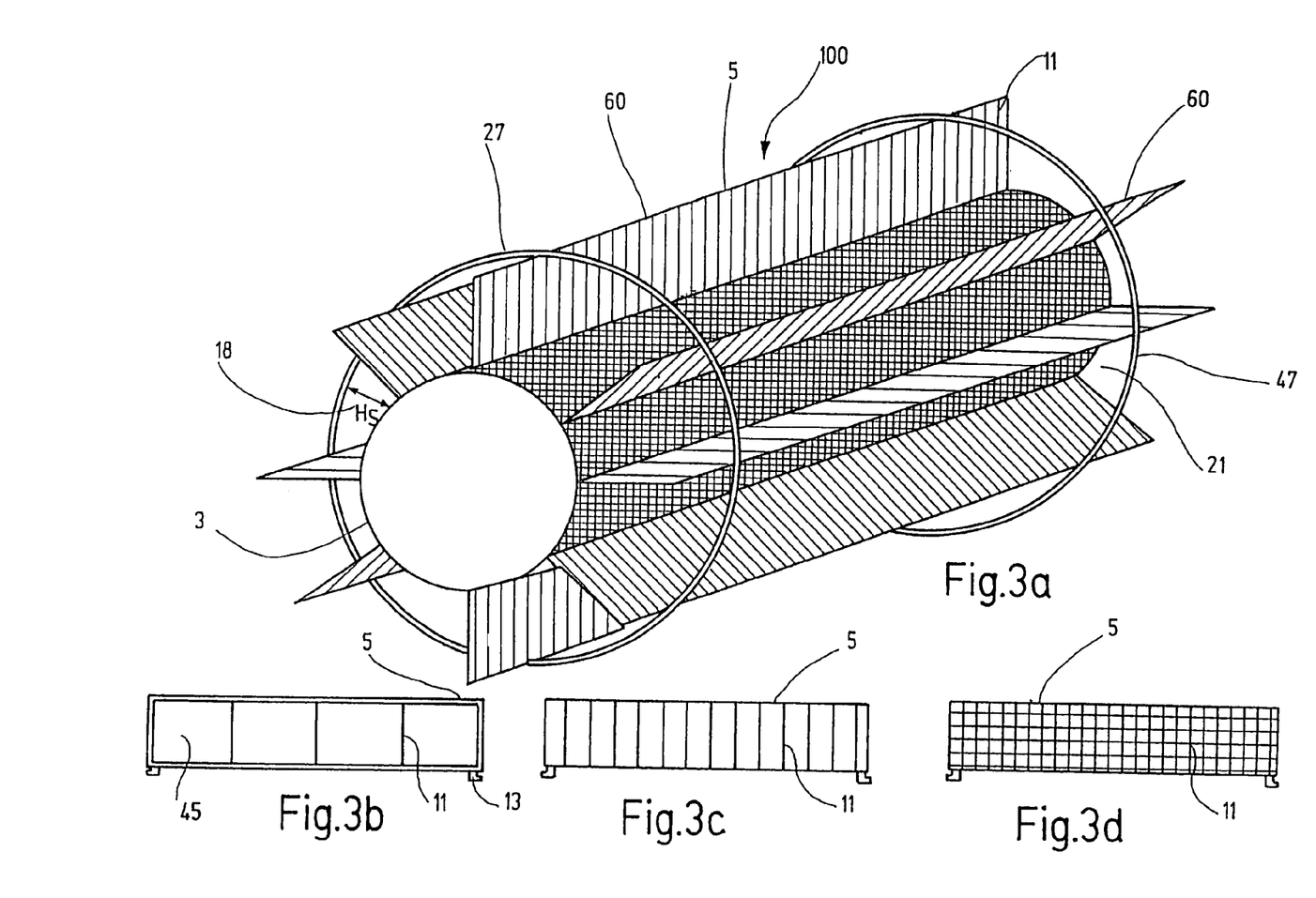

FIG. 3a) shows a perspective illustration of a further embodiment of a hollow fiber membrane module 100 according to the invention. The illustration shows a cylindrical housing 3 whose lateral surface 1 is pierced by numerous perforations or openings 25. The segmentation elements 5 are arranged on, for example fitted on the outwardly facing surface of the housing 3. Also illustrated are the stabilization elements 11, designed as transverse connecting bars, in the segmentation elements 5. Finally, FIG. 3a) shows the holding rings 27, which are arranged concentrically around the housing 3 and around the segmentation elements 5, pointing radially outward, with which they also make contact, and serve for fixing hollow fiber membranes (not illustrated here) that are to be inserted into the compartments 21. Also illustrated is the packing space 18, which is formed on the inside by the outer surface of the housing 3, and at the outside by an imaginary lateral surface 47 which surrounds the segmentation elements 5, makes contact with the outer edges 60 thereof and follows the course of the holding rings 27. This imaginary lateral surface 47 is arranged concentrically around the inner housing 3 at a spacing of height Hs.

FIGS. 3b), 3c) and 3d) show various embodiments of segmentation elements 5 used in accordance with the invention, FIGS. 3b) and 3c) differing in the number of transverse connecting bars 11 and the number of the individual passage surfaces 45 formed thereby.

Stabilization elements 11 designed as a matrix or lattice are illustrated in FIG. 3d).

Figure 4:
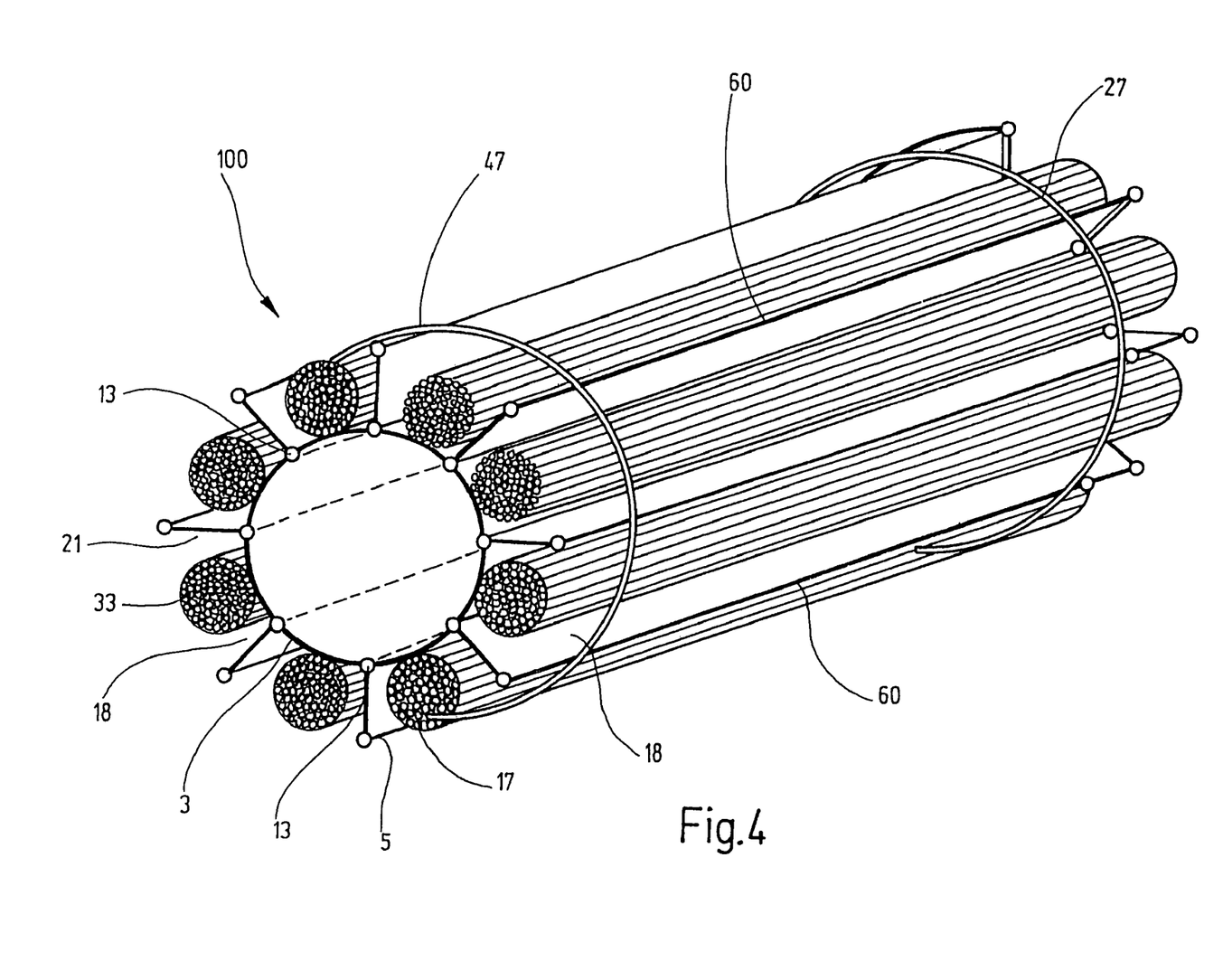
FIG. 4 shows the embodiment of the hollow fiber membrane module according to the invention from FIG. 3, filled with hollow fiber bundles, in perspective view, FIG. 5 (a, b) shows a further exemplary embodiment of the hollow fiber membrane module according to the invention which was produced from stainless steel wire, in its development and in cross section.

FIG. 4 shows a perspective view of a similar hollow fiber membrane module to that in FIG. 3a). It is shown here that hollow fiber membrane bundles 17 whose length is equal to the length of the module 100 are arranged in the individual compartments 21. Here, as well, the packing space 18 is defined as the volume that is formed between the outer surface of the housing 3 and the inner surface of the imaginary lateral surface 47, which surrounds the segmentation elements 5 and makes contact with the outside edges 60 thereof and the course of which is prescribed by the course of the holding rings 27. The enveloping lateral surface 47 is the surface that results when the outwardly pointing longitudinal edges 60 of the segmentation elements 5 are connected to one another around the circumference of the module 100, such that the enveloping lateral surface 47 is arranged concentrically around the inner housing 3.

Figure 5:
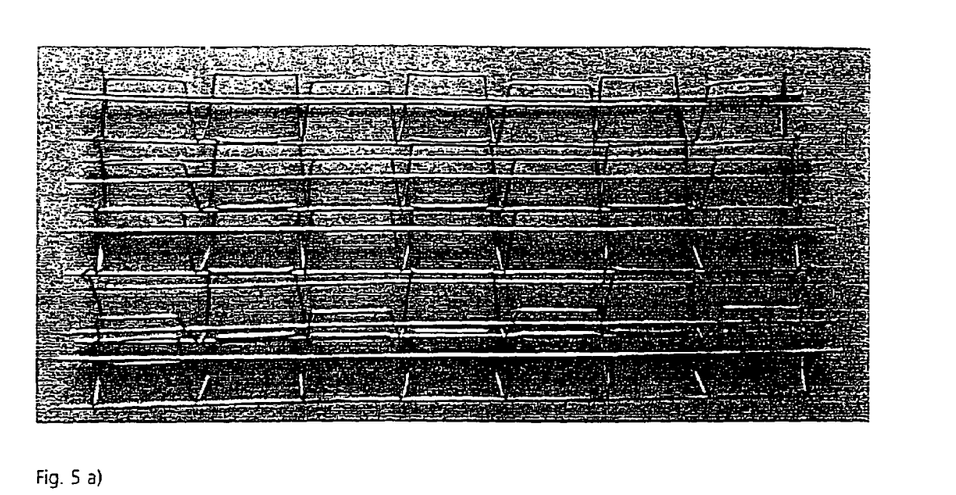

FIG. 5 shows a further exemplary embodiment of the module according to the invention, which was fashioned from stainless steel wire. In this embodiment, one segmentation element and one part of the lateral surface each form permanently interconnected units that are fixed to one another with the aid of eyelets and can therefore be moved with respect to one another such that, in accordance with the schematic FIG. 1, they can be developed situated one behind another into a plane. The surface of the segmentation element is inclined to the lateral surface by an angle of approximately 45 degrees. FIG. 5.a shows a development of the module housing, while FIG. 5.b shows the cross section of the module when folded together, without the hollow fibers that are to be inserted into the compartments.

Figure 6:
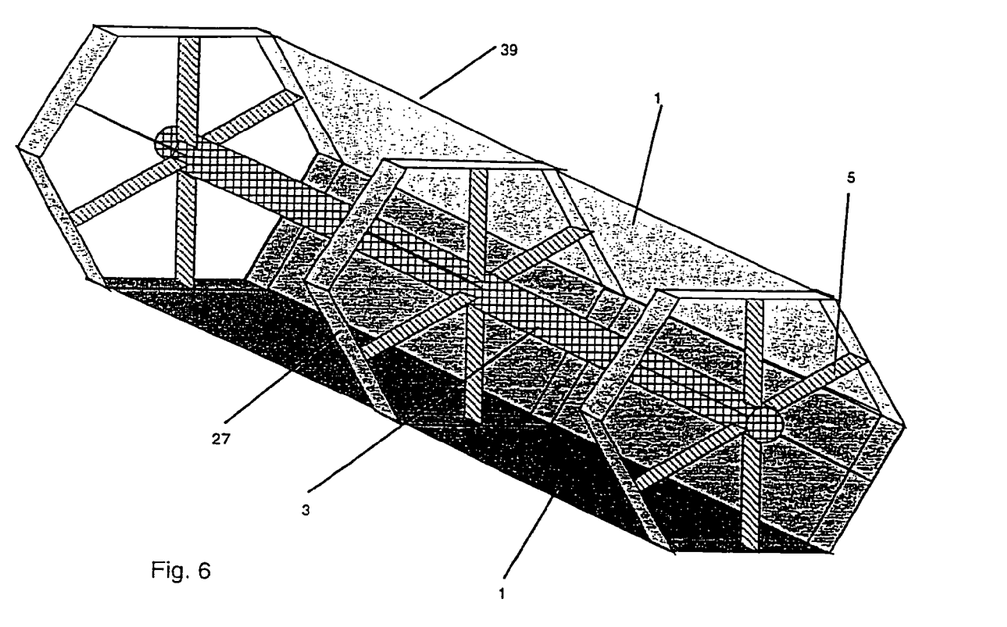
FIG. 6 shows a further exemplary embodiment of the hollow fiber membrane module according to the invention, building on the exemplary embodiment in FIG. 2 with segmentation elements that are shorter than the module length, in a perspective view.

FIG. 6 shows a variant of the exemplary embodiment illustrated in FIG. 2. In this variant, the segmentation elements are only as long as the potting, and they are arranged in each case in the middle and at both ends of the module.

What is claimed is:

1. A hollow fiber membrane module for use in filtration, diafiltration, or dialysis, which comprises:
   (a) an open frame wall that surrounds an inner space;
   (b) at least one segmentation element comprising an open rectangular frame and extending from the wall into a packing space that surrounds the wall on the side opposite the inner space, the segmentation element being open for liquid to pass therethrough;
   (c) an outer structure that surrounds the packing space; and
   (d) at least two hollow fiber membrane bundles arranged parallel to one another in the packing space and retained within the packing space by the wall and the outer structure, wherein each hollow fiber membrane bundle is separated from other hollow fiber membrane bundles by said segmentation element; each hollow fiber membrane bundle including a plurality of tubular hollow fiber membranes, wherein a volumetric ratio of the hollow fiber membranes to the packing space is less than 10%.

2. The hollow fiber membrane module of claim 1, wherein the wall defines a generally cylindrical inner space.

3. The hollow fiber membrane module of claim 1, wherein the hollow fiber membranes comprise at least one material selected from the group consisting of ceramic materials and polymeric materials.

4. The hollow fiber membrane module of claim 3, wherein the hollow fiber membranes comprise a supporting layer, and the hollow fiber membrane and the supporting layer together have a thickness of approximately 5 µm to approximately 300 µm.

5. The hollow fiber membrane module of claim 3, wherein the hollow fiber membrane and the supporting layer together have a thickness of approximately 50 µm to approximately 250 µm.

6. The hollow fiber membrane module of claim 3, wherein each of the hollow fiber membranes has an inside diameter of up to 2 mm.

7. The hollow fiber membrane module of claim 1, wherein the hollow fiber membranes are arranged in at least one bundle having at least one end adapted to be potted.

8. The hollow fiber membrane module of claim 7, wherein the hollow fiber membranes are rolled up as bundles in the form of mats, the hollow fiber membranes being at a spacing adapted to the packing density in the region of the ends adapted to be potted by wrapping with conventional spacer materials.

9. The hollow fiber membrane module of claim 1, wherein the open part of the rectangular frame of the at least one segmentation element is subdivided by stabilization elements.

10. The hollow fiber membrane module of claim 9, wherein the wall has at least one opening with dimensions of approximately 3 mm to approximately 20 mm.

11. The hollow fiber membrane module of claim 10, wherein the ratio of the total area of the openings in the wall to the total area of the wall is approximately 0.2 to approximately 0.9.

12. The hollow fiber membrane module of claim 9, wherein the total area of the stabilization elements to the area formed by the open rectangular frame of the at least one segmentation element is in the range of approximately 2% to approximately 20%.

13. The hollow fiber membrane module of claim 1, wherein the outer structure is a second cage-like housing.

14. The hollow fiber membrane module of claim 1, wherein the length of at least one segmentation element corresponds to the length of the housing.

15. The hollow fiber membrane module of claim 1, wherein the at least one segmentation element is shorter than the wall.

16. The hollow fiber membrane module of claim 1, wherein the at least one segmentation element is fitted on the wall and divides the inner space into compartments.

17. The hollow fiber membrane module of claim 1, wherein the at least one segmentation element is fitted on the wall and divides the portion of the packing space surrounding the wall into compartments.

18. The hollow fiber membrane module of claim 1, wherein the hollow fiber membrane bundles are arranged in at least one compartment produced by at least two segmentation elements, the wall, and the outer structure.

19. The hollow fiber membrane module of claim 18, wherein the hollow fiber membrane bundle is held within the space defined by the wall and two segmentation elements.

20. The hollow fiber membrane module of claim 1 which further comprises a housing connection for feeding a liquid into the fiber interior of the hollow fiber membranes and a housing connection for withdrawing a liquid from the fiber interior.

21. The hollow fiber membrane module of claim 1, wherein all constituents are produced from a material capable of being sterilized with water vapor at 121° C.

22. The hollow fiber membrane module of claim 6, wherein the hollow fiber membranes have an inside diameter of approximately 0.15 mm to approximately 0.8 mm.

23. The hollow fiber membrane module of claim 1, wherein the hollow fiber membranes have either:

a) the same diameter, or b) different diameters.

24. The hollow fiber membrane module of claim 1, wherein the open rectangular frame of the at least one segmentation element is a square.

* * * * *